H. A. RISHEL.
AUTOMOBILE RADIATOR SHIELD.
APPLICATION FILED JAN. 31, 1917.
1,298,095.
Patented Mar. 25, 1919.
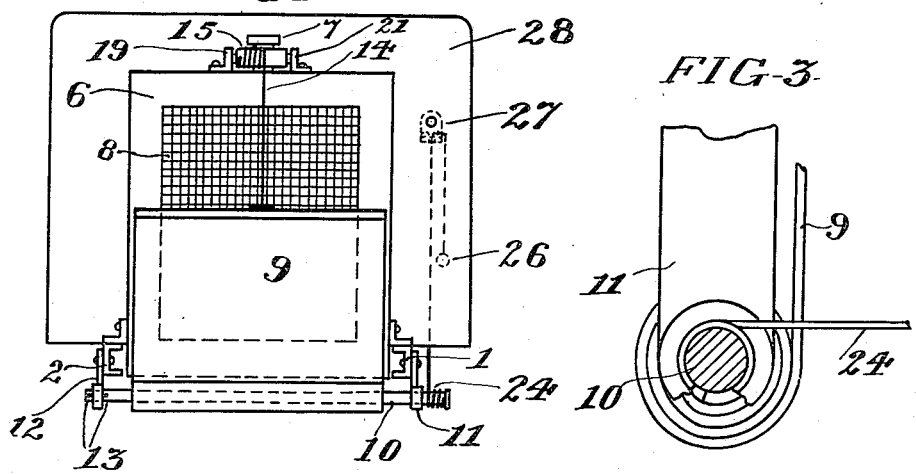
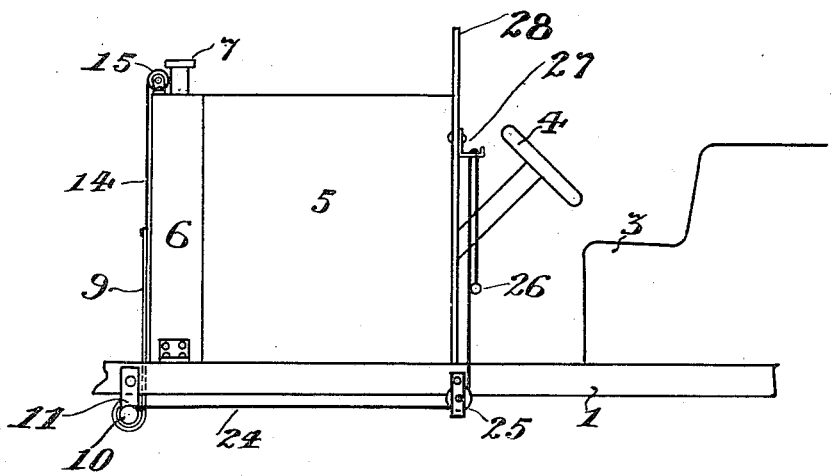
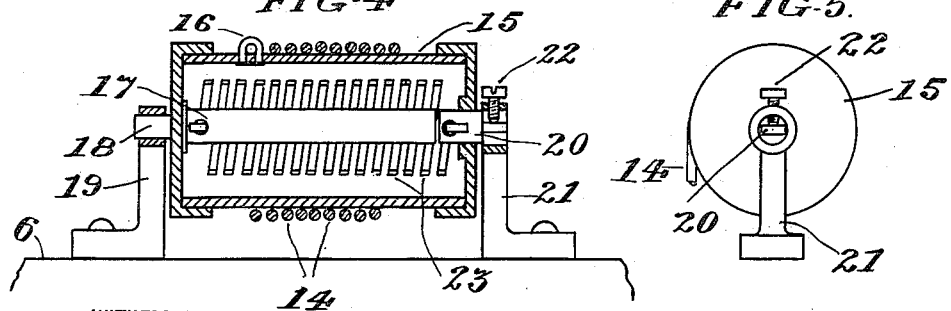
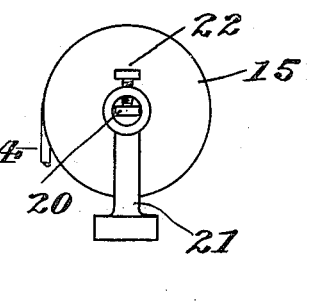
WITNESSES:
INVENTOR
Harry A. Rishel
BY
ATTORNEY

UNITED STATES PATENT OFFICE.

HARRY A. RISHEL, OF PHILADELPHIA, PENNSYLVANIA.

AUTOMOBILE-RADIATOR SHIELD.

1,298,095.  Specification of Letters Patent.  Patented Mar. 25, 1919.

Application filed January 31, 1917. Serial No. 145,740.

*To all whom it may concern:*

Be it known that I, HARRY A. RISHEL, a citizen of the United States, residing at Philadelphia, in the county of Philadelphia, State of Pennsylvania, have invented certain new and useful Improvements in Automobile-Radiator Shields, of which the following is a specification.

My invention relates to means for regulating the temperature of the engine cooling fluid.

When a car is started from rest, it should be started with its radiator shield closed and after it has run for a while it is important that the shield be opened, otherwise there is danger of overheating, but the pressure of wind, more especially head wind, tends to cause a curtain shield to adhere to the face of the radiator and so prevent opening of the shield by rolling it, especially where springs are relied upon to roll and open it.

The principal object of the present invention is to provide for uncovering the radiator when the car is in motion and consequent wind pressure tends to hold the flexible curtain immovably against the face of the radiator, and to this end, stated generally, the invention comprises a manually operated means accessible from the driver's seat for positively rolling a flexible curtain to uncover a radiator against the adherence of the curtain to the radiator when the car is in motion, and mechanism for unrolling the curtain to cover the radiator.

In the accompanying drawings Figure 1 is a front elevational view of an automobile radiator and hood equipped with a shield constructed in accordance with my invention and in position to cover a portion of the forward openings in the radiator; Fig. 2 is a fragmentary side elevational view of the automobile and the equipment illustrated in Fig. 1 conveniently showing the means for controlling the shield from the operator's seat; Fig. 3 is an enlarged end elevational view of the shield with the end plate of the control shaft and a part of the shaft bearing cut away for convenience of illustration; Fig. 4 is an enlarged vertical longitudinal sectional view of the spring drum and its bearings taken axially therethrough; Fig. 5 is an enlarged end elevational view of the spring drums.

In said figures the automobile comprises the longitudinal frame bars 1 and 2, the driver's seat 3, the steering wheel 4, engine hood 5, radiator 6 and water filler 7.

The flexible curtain shield as illustrated in Figs. 1 to 5 inclusive and which is arranged to cover the openings 8 of the radiator 6, comprises the shield 9, of any desired material such as canvas or a series of narrow parallel metal strips hinged together, and is mounted to be wound upon the shaft 10. The said shaft is journaled in the bearings 11 and 12, fastened respectively to the longitudinal frame bars 1 and 2 and prevented from riding out of the said bearings by the cotter pins 13, passing diametrically through said shaft 10, a cotter pin being located on each side of the bearing 12. Attached to the stiffening rod fastened to the free edge of the shield 9 is the flexible connector or hollow drum cable 14, which may be made of steel. This said cable 14 passes from the free or adjacent edge of the flexible shield 9 to the top of the radiator 6, where it is wound around the hollow drum 15, a number of turns sufficient to allow the curtain shield 9 to be lowered completely without entirely unwinding said cable 14 from said drum 15. It is then fastened to the said hollow drum by the fastener 16. The drum 15 has the filler 17 in one end permanently fastened thereto. At the same end of the said hollow drum is also provided a trunnion 18, which is journaled in the bearing 19 fastened to the top of the radiator 6. The other end of said drum is mounted to rotate upon the stationary trunnion 20, held in a given position in the bracket 21 by the tension set screw 22, as is best shown in Fig. 4.

The hollow drum 15 is caused to rotate in a direction tending to wind the cable 14 thereon by the action of the spiral spring 23 within the hollow drum, it being held under tension by the set screw 22. The said spring has one end connected with the stationary trunnion 20 and the other end connected to the filler 17 which is rotated with said drum 15.

The shield 9 is arranged to be operated from the driver's seat 3 by a flexible control cable 24 which may be of steel and which cable must be wound around the shaft 10 a sufficient number of turns and in a direction counter to that which the flexible shield 9 is wound, in order that when the shield 9 is wound entirely upon the shaft 10, the cable 24 will have at the very most, no more than unwound itself therefrom. The control cable 24 passes along the side of the automobile chassis to the sheave 25, around said sheave up alongside of the frame bar 1 to the operator's seat 3 where it terminates in the handle 26, with which the operator may adjust the shield 9 from his seat to variably control the area of the radiator which may be subjected to the action of the air or to withdraw said curtain to such an extent as to entirely expose the radiator.

The cable 24 is fastened to the catch 27 which is conveniently carried on the dashboard 28 by being caught in a wedge-shaped slot made in said catch 27.

As shown in Figs. 1 and 2, the curtain shield 9 is carried transversely of the hood, along the bottom of the openings 8 in the radiator 6 and by the arrangement of the control cable 24 and the sheave 25, the curtain shield may be drawn downward in opposition to the action of the spring 23 by the control cable 24, causing the shaft 10 to rotate as it unwinds therefrom due to the operator pulling on said cable 24 and thus winding the shield 9 upon the said shaft 10 and when the desired area of exposure is obtained, to wedge cable 24 in catch 27, allowing the free or handle end to hang pendent.

I do not desire to limit my invention to the precise details of construction and arrangement herein set forth as it is obvious that various modifications may be made therein without departing from the essential features of the invention as defined in the appended claim.

Having thus described my invention, I claim:

A shield for automobile radiators comprising the combination of a flexible curtain, a roller upon which the curtain is rolled to uncover the radiator, fixed bearings for the roller and manually operated means accessible from the driver's seat and adapted to positively turn said roller to roll the curtain against adherence to the radiator face caused by wind pressure when the car is in motion, and a recoil device for unrolling the curtain to cover the radiator, substantially as described.

In testimony whereof I have hereunto set my hand in the presence of two subscribing witnesses.

HARRY A. RISHEL.

Witnesses:
EDWIN J. WALKER,
GEORGE MARX.